United States Patent [19]
Campbell et al.

[11] 3,964,578
[45] June 22, 1976

[54] ENERGY ABSORBER

[75] Inventors: Lewis B. Campbell, Centerville;
Robert E. Huffman, Tipp City;
Robert L. Jones, Bellbrook, all of
Ohio

[73] Assignee: General Motors Corporation, Detroit, Mich.

[22] Filed: Aug. 27, 1975

[21] Appl. No.: 608,155

[52] U.S. Cl. .............................. 188/1 C; 280/752
[51] Int. Cl.² .................... F16F 7/12; B60R 21/04
[58] Field of Search .................. 280/150 B; 180/90; 188/1 C

[56] References Cited
UNITED STATES PATENTS

| | | | |
|---|---|---|---|
| 3,412,628 | 11/1968 | De Gain | 280/150 B |
| 3,439,769 | 4/1969 | Brilmyer | 280/150 B |
| 3,599,757 | 8/1971 | Takamatsu | 188/1 C |
| 3,612,223 | 10/1971 | Shiono | 188/1 C |
| 3,765,335 | 10/1973 | Bair | 188/1 C |
| 3,850,447 | 11/1974 | Nagazumi | 280/150 B |

*Primary Examiner*—Robert R. Song
*Attorney, Agent, or Firm*—Herbert Furman

[57] ABSTRACT

An energy absorber adapted to be interposed between relatively movable rigid support and impact receiving elements and including a sheet metal plate of rectangular shape. The plate is provided with two asymmetric spaced U-shaped slots and a pair of spaced parallel slots to divide the plate into a continuous integral outer portion; an asymmetric pair of generally U-shape inner portions, the legs of which are integrally connected to the continuous outer portion by bridging portions; and a center portion of rectangular shape integrally connecting the bights of the inner portions. The outer portion is secured to one of the elements and the center portion is secured to the other by a rigid post. Upon impact loads applied to the impact receiving element, the U-shape inner portions fold relative to each other and the outer portion about the bridging portions and the center portion folds upon itself and relative to the U-shape inner portions to form the energy absorber into generally trapezoidal shape and absorb energy.

3 Claims, 5 Drawing Figures

ENERGY ABSORBER

This invention relates to energy absorbers and more particularly to an energy absorber of plastically deformable material having a plurality of integrally interconnected portions which fold relative to each other under impact loads to thereby absorb the energy of such loads.

Generally the energy absorber of this invention includes a planar sheet metal plate of rectangular shape. The plate is slotted to provide asymmetric generally U-shape inner portions which are connected to a continuous peripheral or outer portion by integral bridging portions. The bights of the U-shape portions are interconnected by an integral center portion. The outer or peripheral portion is secured to an impact receiving element and the center portion is connected by a rigid post to a rigid support element. As the impact receiving element receives impact loads and moves relatively toward the rigid support element, the inner portions fold toward each other about the bridging portions while the center portion folds upon itself and relative to the inner portions so that the inner portions and center portion assume a trapezoidal shape and the energy is absorbed. Alternately, the energy absorber may be formed into trapezoidal shape and the inner portions and center portions may fold relative to each other and the outer portion under impact loads into a generally planar shape as the energy is absorbed.

Energy absorbing members of sheet metal are well known and it is also well known to deform such members such as by shearing, curling and fragmenting in order to absorb the energy of impact loads received by the member from an impact receiving element. However, the energy absorber of this invention differs in that its various portions are formed integrally with each other and nest within each other so that a very compact energy absorber can be provided and one which remains intact during the energy absorbing process.

The primary feature of this invention is that it provides an improved energy absorber of plastically deformable material which includes a plurality of separated and integrally interconnected portions which fold relative to each other under impact loads to absorb the energy of impact loads received by the absorber. Another feature is that the energy absorber includes an outer portion which is secured to one of a pair of relatively movable elements and a foldable center portion which is secured to the other element and integrally connected to the outer portion by foldable inner portions, with the folding movement of the center and inner portions relative to each other and to the outer portion absorbing the energy of impact loads. A further feature is that the energy absorber is slotted to provide the various portions. Yet another feature is that the inner portions are of generally asymmetric U-shape and are integrally connected to the outer portion by bridging portions, with the center portion interconnecting the bights of the inner portions, the center portion folding upon itself and relative to the inner portions as the inner portions fold relative to each other and to the outer portion under impact loads received by the absorber. Yet a further feature is that the folding movement of the various portions causes the absorber to change from a generally planar initial shape to a generally trapezoidal final shape.

These and other features of the invention will be readily apparent from the following specification and drawings wherein.

Figure 1:
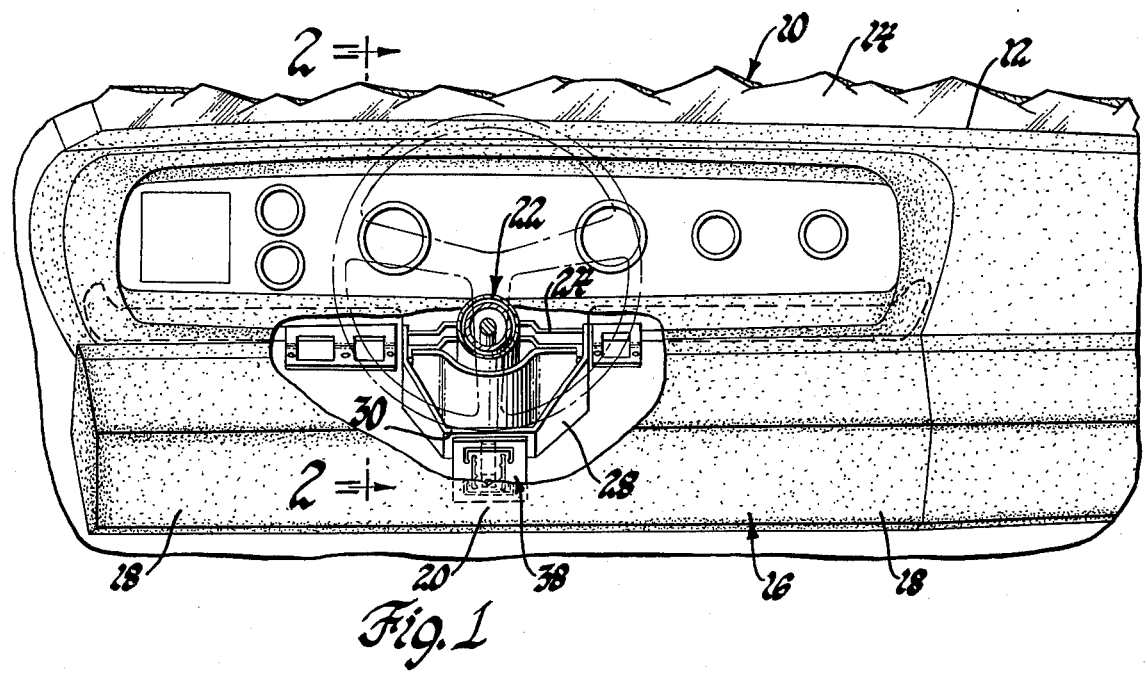
FIG. 1 is a partially broken away partial view of a vehicle instrument panel structure having a knee restraint mounted thereon for absorbing the energy of impact loads of th driver's knees, with an energy absorber according to this invention interconnecting the knee restraint and rigid support structure for the energy absorbing steering column.

Referring now particularly to FIG. 1 of the drawings, a vehicle designated generally 10 includes an instrument panel 12 and a windshield 14. The driver's position in the vehicle is provided with an occupant knee restraint 16 which generally includes left hand and right hand driver knee deformable side portions 18 and a center portion 20. The knee restraint 16 forms no part of this invention. Reference may be had to copending application Ser. No. 276,084 Arntson et al., filed July 28, 1972, now U.S. Pat. No. 3,907,326 for details of the knee restraint and the manner in which the knee restraint functions. Additionally, reference may be had to Ser. No. 406,262 Arntson et al. filed Oct. 15, 1973 now U.S. Pat. No. 3,897,848 for an additional embodiment of the knee restraint 16.

The vehicle 10 includes an energy absorbing steering column assembly 22. This steering column assembly is shown in detail in Arntson et al. U.S. Pat. No. 3,702,181 issued Nov. 7, 1972 and therefore such details will not be disclosed herein. It will be generally understood that such steering column assembly is supported on the vehicle by rigid column support structure 24 to ensure collapse of the rearward portion of the column assembly relative to the forward portion under impact loads applied to the column assembly by the torso or upper portion of the driver 26 schematically indicated in FIG. 2.

Figure 2:
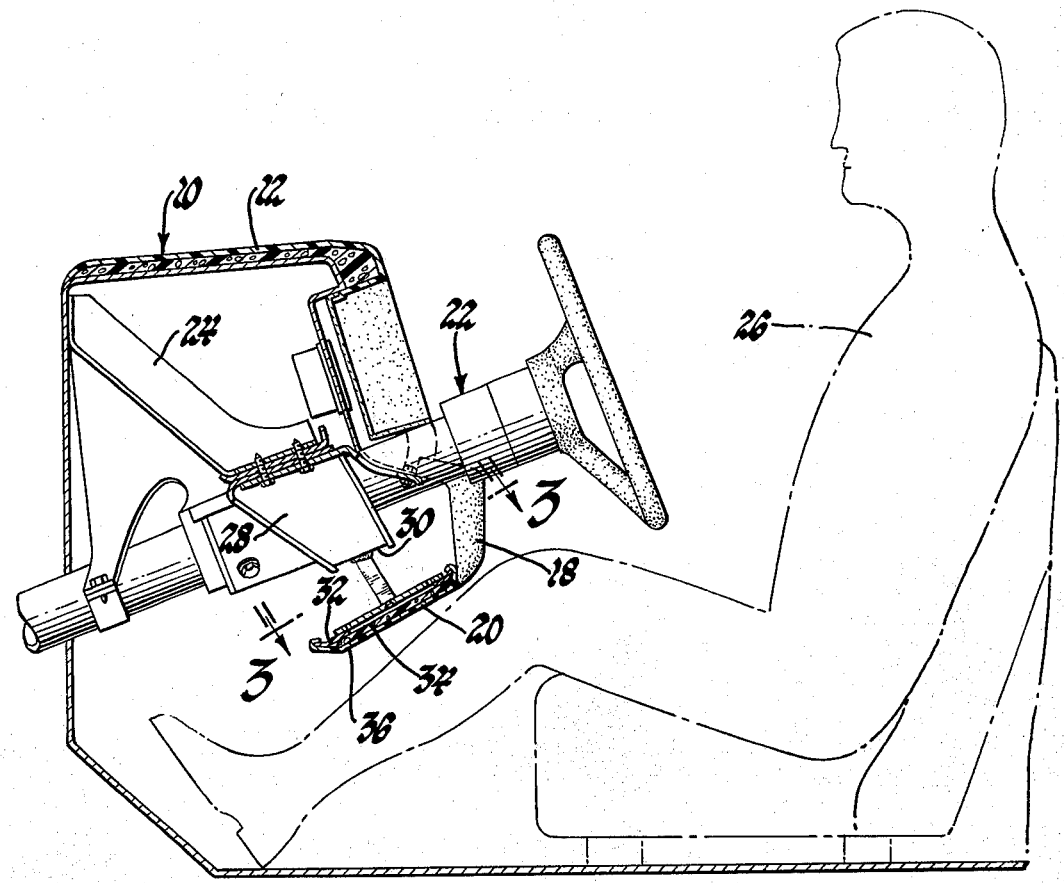
FIG. 2 is an enlarged view taken generally along the plane indicated by line 2—2 of FIG. 1 and showing the knee restraint and energy absorber under nonimpact conditions.

The aforenoted Arntson et al applications disclose the center portion 20 of the knee restraint being secured to the column support structure 24 by a rigid generally U-shape bracket, the bracket 118 in the first enumerated Arntson et al application and a similar bracket 144 in the second enumerated Arntson et al. application. A bracket 28, FIGS. 1 and 2, is mounted to the column support structure 24 in the same manner as the brackets 118 and 144 disclosed in the aforenoted Arntson et al. applications, and the details of this mounting are therefore not shown. The bracket 28 is the same as the aforeenumerated brackets 118 and 144 except that it is shallower in depth and the bight portion 30 thereof is spaced from the center portion 20 of the knee restraint rather than being connected to this center portion as in the aforenoted Arntson et al. applications.

The knee restraint 16 briefly includes a backing plate 32 of thin sheet metal, a thin outer layer 34 of foam material covering plate 32 and a cover 36 of decorative material, such as vinyl. The cover 36 extends only over the edge portions of the plate 32.

An energy absorber 38 according to this invention is connected between the center portion 20 of the knee restraint and the bracket 28 in order to cooperate with the knee restraint in absorbing the energy of impact loads applied to the knee restraint by the knees of the driver 26 under impact conditions. Under such conditions, the driver moves forwardly of the schematically indicated vehicle seat, FIG. 2, and his knees deform the side portions 18 of the plate 32 of the knee restraint, FIG. 4. The deformation of plate 32 of the knee restraint absorbs energy and also applies compressive loads longitudinally of the femurs of the driver within predetermined tolerance limits to control the kinematics of the upper torso of the driver with respect to the steering column assembly 22. The aforenoted Arntson et al applications give a detailed explanation of the manner in which the knee restraint functions and the manner in which the kinematics of the driver are controlled.

Figure 3:
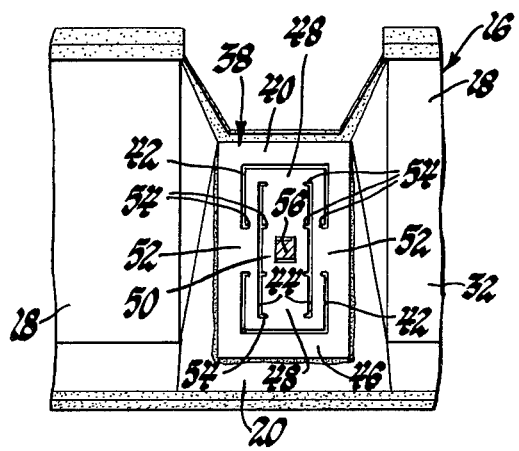
FIG. 3 is an enlarged view taken generally along the plane indicated by line 3—3 of FIG. 2.
Figure 5:
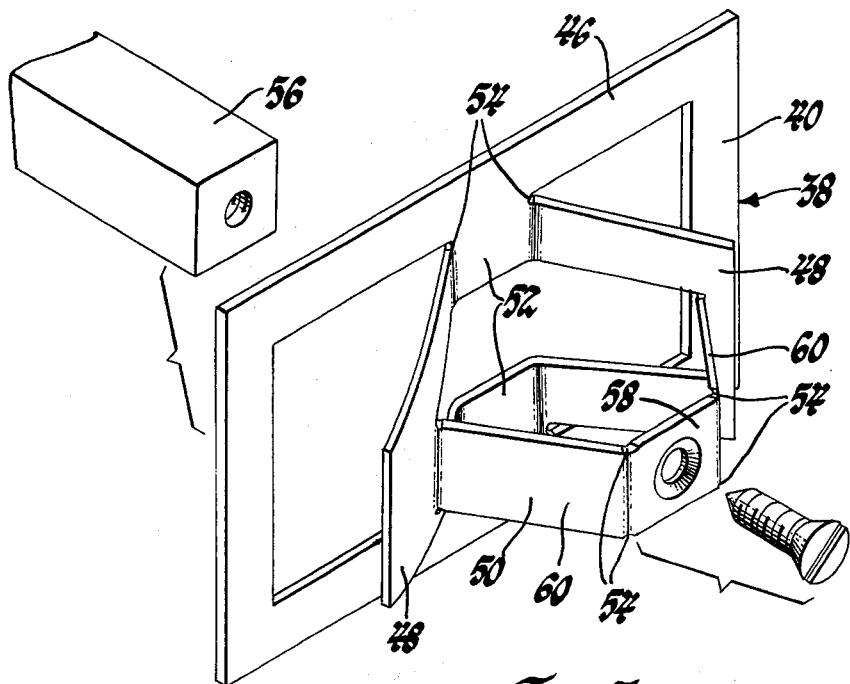
FIG. 5 is an exploded perspective view of the energy absorber as folded by impact loads from an initially planar shape to a final trapezoidal shape.

Generally as shown in FIG. 3, the energy absorber 38 includes a generally rectangularly shaped metal plate 40 which is provided with an asymmetric pair of U-shape slots 42 and a pair of parallel slots 44 to provide an outer or peripheral portion 46, a pair of generally U-shape asymmetric inner portions 48, and a center portion 50. The legs of the asymmetric inner portions 48 are integrally connected to each other and to the outer portion 46 by integral bridging portions 52. The center portion 50 integrally interconnects the bights of the asymmetric inner portions 48. In order to control the bending locations of the inner portions 48 and the center portion 50, the slots 42 and 44 have enlargements 54, FIGS. 3 and 5, at predetermined locations along the length thereof.

The outer portion 46 is welded or brazed or otherwise rigidly secured to the backing plate 32 of the knee restraint 16 at the center portion 20 thereof as shown in FIGS. 2 and 3. A rigid post 56, bolted to the center portion 50 and otherwise welded or secured to the bracket 28, FIG. 2, interconnects the energy absorber and the rigid column support structure 24.

Figure 4:
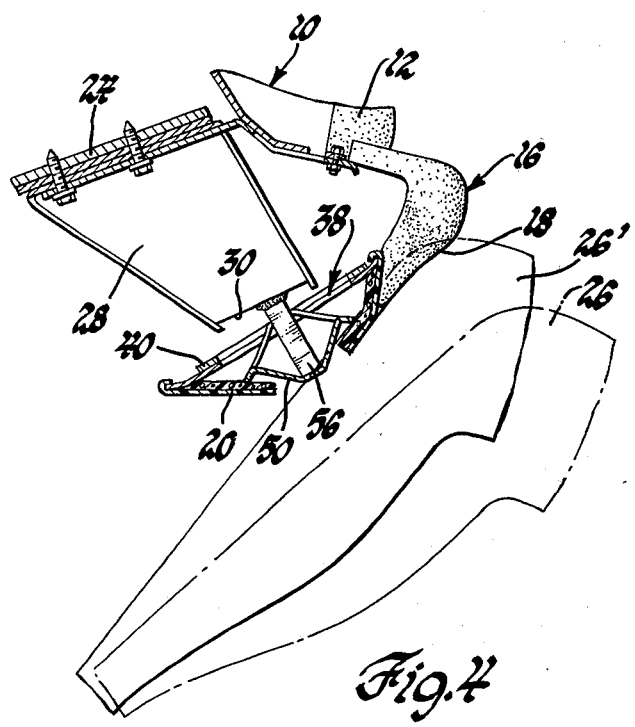
FIG. 4 is a partial view similar to FIG. 2 and showing the knee restraint and the energy absorber under impact conditions.

Under impact conditions and movement of the driver 26 forwardly relative to the vehicle seat, the knees of the driver contact the side portions 18 of the knee restraint and deform these side portions. This is indicated in FIG. 4, with the driver's knees being indicated in normal or non-impact location by 26 and in impact location by 26'. When the driver's knees contact the knee restraint, the layer 34 and cover 36 of the side portions 18 pocket the driver's knees and the deformation of the backing plate 32 absorbs energy and applies a compressive load generally longitudinally of the femurs of the driver to control his kinematics.

As the side portions 18 of the knee restraint are initially deformed by the driver's knees, the center portion of the plate 32 will be placed under load in a direction toward the bracket 28. Movement of the center portion of the plate 32 toward the bracket 28 is blocked by the rigid post 56 and the engagement of the center part 58 of portion 50 of the energy absorber with plate 32. As the load on the center portion of plate 32 is increased, the plate will rupture opposite the post 56 and the center part 58 of portion 50. After rupture, the center portion 20 of plate 32 moves toward bracket 28 and relative to post 56 as the energy absorber 38 absorbs energy. The inner portions 48 fold relative to each other, to portion 46, and to the bridging portions 52 from their planar position, shown in FIGS. 2 and 3, to their angular position shown in FIGS. 4 and 5. The side parts 60 of portion 50 fold relative to the center part 58 as the center portion 46 folds relative to itself, to the inner portions 48 and to the outer portion as the inner portions fold so that the center portion 50 likewise folds from the planar position of FIGS. 2 and 3 to the angular position of FIGS. 4 and 5.

The degree of folding movement of the inner portions and the center portion will, of course, depend upon the level of the impact loads applied to the knee restraint and the level of the loads to be absorbed by the folding movement of these portions. While the inner portions and center portion will assume the generally trapezoidal shape shown in FIGS. 4 and 5, the exact shape will vary with the loads to be absorbed. Since the post 56 extends to the center part 58 of portion 50, the sides 60 of this portion and the inner portions 48 can fold without any interference as the outer portion 46 and the ruptured plate 32 move relative to the post.

While the energy absorber of this invention has been shown as folding from an initial generally planar shape to a final generally trapezoidal shape, it will be understood, of course, that the initial shape can be generally trapezoidal and the final shape planar by bending the energy absorber to trapezoidal shape during manufacture thereof, shortening post 56, and locating the absorber between the shortened post and plate 32 such that it folds to planar shape under impact loads.

Likewise while the energy absorber has been shown and described in conjunction with a driver knee restraint, it will be understood that it can function in whatever location an energy absorber may be required.

Thus this invention provides an improved energy absorber.

We claim:

1. An energy absorber adapted to be interposed between a rigid support element and an impact receiving element movable relative to the support element under impact loads comprising, in combination, a member of plastically deformable material including a continuous integral outer portion for securement to one of said elements, said member also including a like shaped continuous inner portion within the outer portion, the inner portion being integrally connected at two spaced locations to the outer portion to divide the inner portion into two separate units foldable relative to each other and to the outer portion, said member further including a like shaped center portion within the inner portion for securement to the other of said elements, the center portion being integrally connected to the inner portion of two spaced locations intermediate the first locations for folding of the center portion relative to the units of the inner portion as the units of the inner portion fold relative to the outer portion, said absorber being so proportioned and arranged that the outer portion, inner portion and center portion of said member in plan view along a line drawn between said elements nest within each other whereby the absorber may be made from a flat sheet pierced to define said portions in said plan view and then formed in one direction out of the plane of the sheet in a generally trapezoidal elevational configuration capable of collapsing when said elements move towards each other.

2. An energy absorber adapted to be interposed between a rigid support element and an impact receiving element movable relative to the support element under impact loads comprising, in combination, a member of plastically deformable material including a continuous generally rectangularly shaped outer portion for securement to one element and including pairs of spaced parallel integrally connected outer legs, a pair of generally U-shape inner portions asymmetrically nested within the outer portion and coplanar therewith, bridging portions integrally connecting respective legs of the inner portions to a pair of legs of the outer portion for folding movement of the inner portions about the bridging portions toward each other and out of coplanar relationship to the outer portion, a center portion nested within the inner portion and coplanar therewith for securement to the other element, the center portion integrally connecting the bights of the inner portions and folding upon itself into a generally U-shape as the inner portions fold toward each other.

3. An energy absorber adapted to be interposed between a rigid support element and an impact receiving element movable relative to the support element under impact loads comprising, in combination, a member of plastically deformable material including a continuous generally polygonally shaped outer portion for securement to one element and including a plurality of integrally connected legs, a plurality of integrally connected legs within the outer portion arranged into an asymmetric pair of U-shape inner portions, bridging portions integrally interconnecting respective legs of the U-shape inner portions and a leg of the outer portion to provide for folding of the U-shape portions about the bridging portions relative to each other and to the outer portion, and a foldable center portion within the U-shape portions for securement to the other element, the center portion integrally connecting the bight portions of the U-shape portions and folding relative to itself as the U-shape inner portions fold relative to each other and to the outer portion.

* * * * *